United States Patent [19]

Wulfing

[11] Patent Number: 4,472,753
[45] Date of Patent: Sep. 18, 1984

[54] BRAKING MECHANISM FOR CASSETTE TAPE REEL

[75] Inventor: James J. Wulfing, Afton, Minn.

[73] Assignee: Minnesota Mining and Manufacturing Company, St. Paul, Minn.

[21] Appl. No.: 544,867

[22] Filed: Oct. 24, 1983

[51] Int. Cl.³ ............... G11B 23/02; G11B 15/12; G03B 1/04; B65H 17/48
[52] U.S. Cl. .................... 360/132; 242/198; 242/55.19 A; 360/63
[58] Field of Search .............. 360/132, 93, 60, 92; 242/197, 198, 200, 55.19 A, 199; 352/72, 73, 96

[56] References Cited

U.S. PATENT DOCUMENTS

| | | | |
|---|---|---|---|
| 4,022,402 | 5/1977 | Morimoto | 360/96 |
| 4,106,724 | 8/1978 | Higashida | 242/198 |
| 4,148,443 | 4/1979 | Lundquist | 242/55.19 A |
| 4,214,719 | 7/1980 | Kato | 242/198 |
| 4,367,850 | 1/1983 | Moris | 242/55.19 A |
| 4,412,663 | 11/1983 | Martinesco | 360/132 |
| 4,419,708 | 12/1983 | Ogiro | 360/132 |

Primary Examiner—Robert Martin Kilgore
Attorney, Agent, or Firm—Donald M. Sell; James A. Smith; William L. Huebsch

[57] ABSTRACT

The length of tape that can be wound into a videotape cassette such as Betamax or VHS can be increased by modifying the casette to employ the braking mechanism of the invention. This involves a flanged reel in which teeth are formed only in the outer face of one flange, and a brake lever which has a finger formed with a tooth-engaging ramp that is inclined at 30°-60° to the inner face of said flange when the finger fits between adjacent teeth.

9 Claims, 5 Drawing Figures

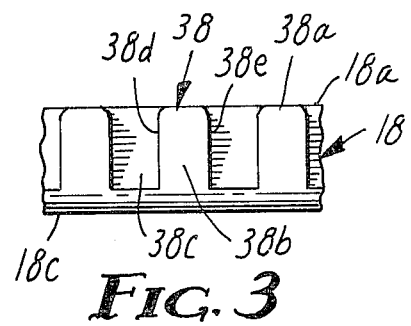
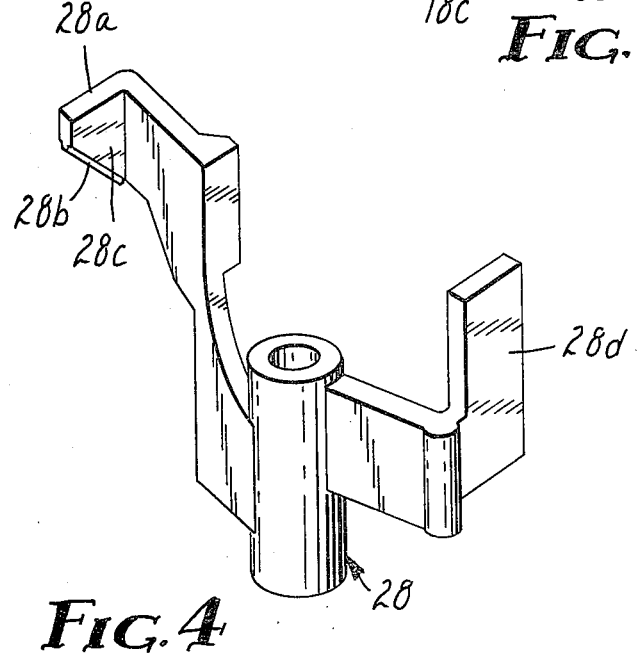
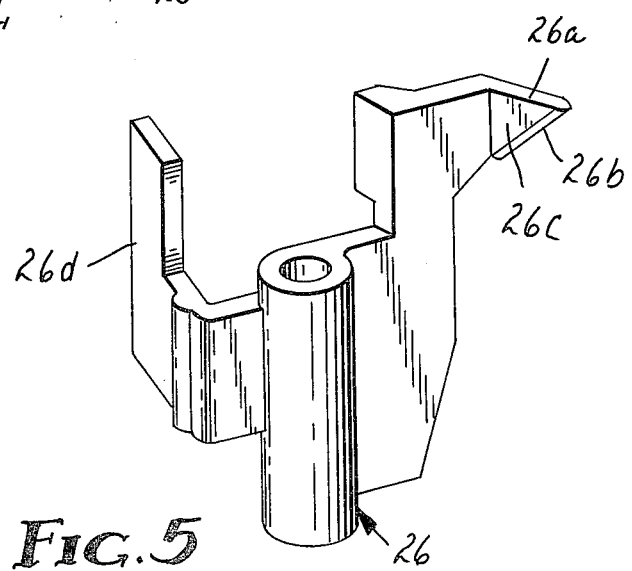

BRAKING MECHANISM FOR CASSETTE TAPE REEL

FIELD OF THE INVENTION

The invention concerns a braking mechanism for preventing rotation of a tape reel of a recording tape cassette during handling and shipment.

BACKGROUND ART

Each of the Betamax and VHS videotape cassettes has a pair of plastic brake levers which engage peripheral teeth in the lower flange of each tape reel to lock the reels when the cassette is not in use. The braking mechanism of a conventional Betamax videotape cassette is illustrated in FIGS. 1-5 of U.S. Pat. No. 4,214,719 (Kato). As disclosed at the bottom of column 4, when the visor-type door or lid 5 is opened, actuating projections 6'rotate or pivot brake levers 33a and 33b against urging forces of respective torsion springs to disengage a finger 36 of each lever from the teeth 26 of the reels (see also FIG. 11).

The braking mechanism of a conventional VHS videotape cassette is illustrated in U.S. Pat. No. 4,106,724 (Higashida). When a VHS videotape cassette is positioned on a deck, a fixed pin 26 on the deck rotates or pivots a brake release member 21, which in turn pivots the pair of brake levers 15 and 16 against the force of springs 19 and 20 to lift the fingers 15a and 16a out of engagement with the teeth 12 and 11, respectively.

The brake levers limit the amount of tape that can be wound into the Betamax and VHS videotape cassettes and hence limit the playing time.

The takeup reel of the VHS-C (compact) videotape cassette has peripheral teeth in its lower flange, by which the reel is locked when the cassette is not in use. The outer face of the supply reel is formed with teeth which fit into indentation formed in the base of the cassette and are pressed against those indentations by a metal leaf spring which is mounted on the cover of the cassette and presses against the hub of the supply reel. In spite of this, the supply roll sometimes rotates when handled and shipped so that the tape becomes loose and tangled.

DISCLOSURE OF THE INVENTION

The braking mechanism of the present invention effectively locks the reels of a recording tape cassette against rotation during handling and storage but unlike conventional Betamax and VHS videotape cassettes, it does not limit the amount of tape that can be wound into the videocassette. As in each of the Betamax and VHS cassettes, the novel braking mechanism includes (a) a rotatable tape reel having a flange formed with peripheral teeth for releasably locking the reel against rotation, (b) a pivotable brake lever including a finger which fits between adjacent teeth, and (c) spring means biasing the lever to engage the finger with the teeth.

The novel braking mechanism differs from those of conventional Betamax and VHS videotape cassettes in that the teeth are formed only in the outer face of said toothed flange and the finger is formed with a tooth-engaging ramp which is inclined at an angle of 30°-60° to the untoothed inner face of said flange when the finger fits between adjacent teeth.

Preferably the ramp and the roots of the teeth are inclined at the same angle when the finger fits between adjacent teeth. To insure against slippage, the sides of the teeth may be substantially perpendicular to the inner face of the toothed flange, as are the sides of the finger when it fits between adjacent teeth. In a preferred embodiment of the invention, each tooth is triangular in the radial direction, a first edge of the tooth extending parallel to the inner face of the toothed flange and a second edge extending perpendicular to said inner face. The periphery of the flange may be rounded between the roots of the teeth and the inner face of the toothed flange.

When the invention is embodied in a Betamax, VHS or VHS-C videotape cassette, each of which comprises a base and cover providing broad parallel bottom and top walls, respectively, there may be a post projecting from the bottom wall on which the brake lever is rotatably journalled. A coil spring may fit over the post to bias the brake lever into engagement with the teeth of the outer flange. Preferably the tape reel is positioned with its toothed flange adjacent the top wall, and the maximum spacing between the top wall and the top of the finger is less than the thickness of the toothed flange. Hence, even when the cassettes is dropped onto concrete, the toothed flange cannot override the finger.

A Betamax or VHS cassette embodying the invention would normally have two tape reels and brake levers, and for economy both brake levers would be molded plastic such as acetal resin or acrylonitrils-butadiene-styrene (ABS) copolymer. As in conventional Betamax and VHS videotape cassettes, the spring means for each brake lever may be a metal coil spring which fits over the post on which the brake lever is journalled. Preferred metal coil spring materials are stainless steels, high carbon spring steels, and copper or nickel base alloys.

THE DRAWING

FIGS. 1-5 of the drawing show a Betamax-type videotape cassette embodying the reel braking mechanism of the invention wherein:

FIG. 3 is an enlarged partial edge view showing the shape of the teeth of flanges of the cassette;

FIG. 4 is an enlarged perspective view of one of the brake levers; and

FIG. 5 is an enlarged perspective view of the other brake lever.

Figure 1:
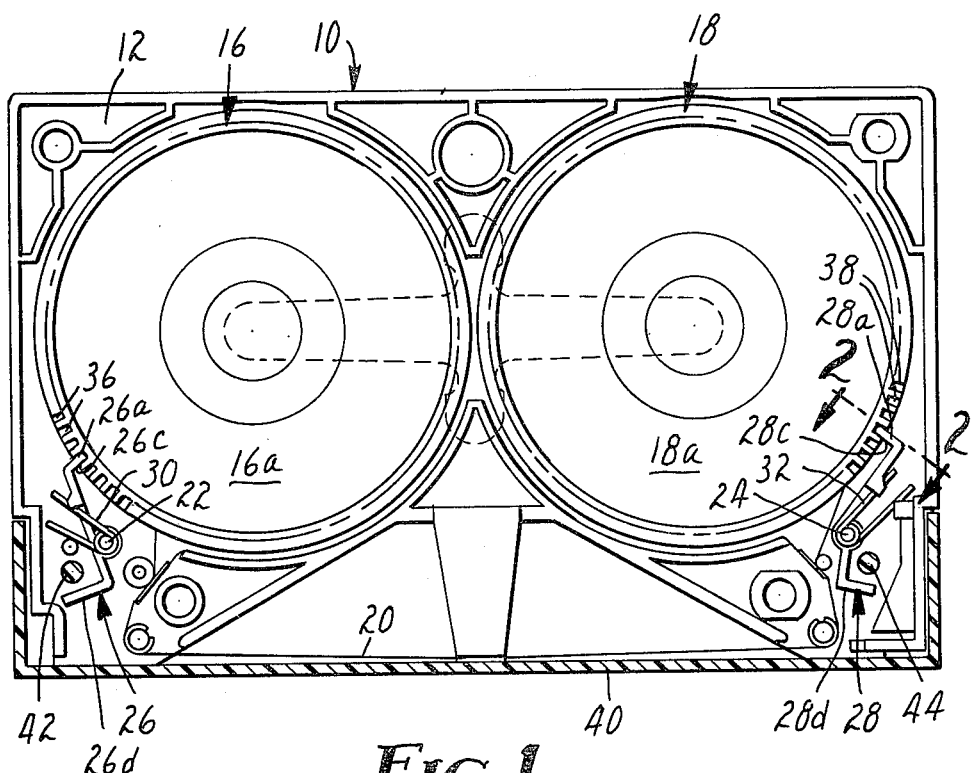
FIG. 1 is a schematic top view of a cassette with its cover removed.
Figure 2:
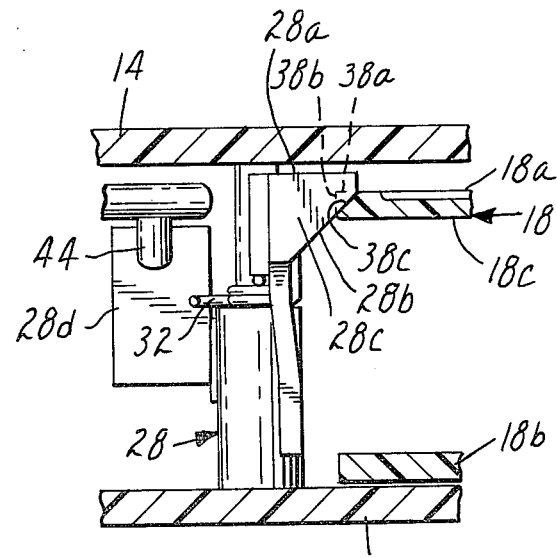
FIG. 2 is an enlarged fragmentary cross-section along line 2—2 of FIG. 1 showing details of one of the toothed flanges and its brake lever.

The Betamax-type videotape cassette 10 of FIG. 1 comprises a base 12, a cover 14, two tape reels 16 and 18, and a length of tape 20 wound on and extending between the reels. The reels 16 and 18 have toothed upper flanges 16a and 18a and untoothed lower flanges, one of which 18b, is shown in FIG. 2. Projecting from the bottom wall of the base 12 are two posts 22 and 24 on which are journalled brake levers 26 and 28, respectively. When the cassette 10 is not in use, a wire coil spring 30 which fits over the post 22 biases the brake lever 26 clockwise into engagement with teeth 36 at the periphery of one upper flange 16a. A second wire coil spring 32 biases the brake lever 28 counterclockwise into engagement with teeth 38 of the other upper flange 18a.

The brake levers 26 and 28 have fingers 26a and 28a which are formed with tooth-engaging ramps 26b and 28b, respectively, that are inclined at an angle of 45° to the inner faces of the upper flanges 16a and 18a, respectively, when the fingers engage the flanges. The roots of the teeth 36 and 38 of the upper flanges 16a and 18a, respectively, are also inclined at an angle of 45° to the inner faces of the upper flanges 16a and 18a.

In the radial direction (as in FIG. 2) each of the teeth 36 and 38 is triangular. A first edge 38a of each of the teeth 38 extends parallel to, a second edge 38b extends perpendicular to, and the root edge 38c extends at an angle of 45° to the inner face 18c of the upper flange 18a. The periphery of the flange 18a is rounded between the roots of the teeth 38 and the inner face 18c of the flange 18a.

In the circumferential direction (FIG. 3), the sides 38d and 38e of each of the teeth 38 are substantially perpendicular to the inner face 18c of the upper flange 18a. The sides 26c and 28c of the fingers 26a and 28a likewise are substantially perpendicular to the inner faces of the toothed flanges when the fingers engage the teeth 36 and 38.

When the cassette 10 is placed on a Betamax deck, the visor-type door 40 is pivoted open, thus pivoting projections 42 and 44 which contact arms 26d and 28d of the brake levers 26 and 28, respectively. This pivots the brake levers to lift their fingers 26a and 28a out of engagement with the teeth 36 and 38, thus freeing the tape reels 16 and 18 for rotation.

A Betamax-type videotape cassette as shown in FIG. 1-4 has been constructed with the brake levers molded from acetal plastic and the upper flanges 16a and 18a molded from styrene-acrylonitrile copolymer plastic. Each of the teeth 36 and 38 had the following dimensions:

Thickness: 0.8 mm
Length at root: 1.0 mm
Spacing: 1.2 mm

Each of the fingers 26a and 28a had a width of 1.1 mm. A length of magnetic recording tape was wound into the cassette such that when fully wound onto either reel, the outermost convolution was 7.4 cm in diameter, within 0.4 mm of the periphery of the reel, and within an average of 0.8 mm of the walls around the reel peripheries. In contrast, Betamax-type cassettes now on the market have a maximum wound tape diameter of about 7.0 cm. Hence, the present invention allows the tape length to be increased about 13 percent.

I claim:

1. A recording tape cassette including (a) a rotatable tape reel having a flange formed with peripheral teeth for releasably locking the reel against rotation, (b) a pivotable brake lever including a finger which fits between adjacent teeth, and (c) spring means biasing the lever to engage the finger with the teeth, wherein the improvement comprises:
   the teeth are formed only in the outer face of said flange and
   the finger is formed with a tooth-engaging ramp which is inclined at an angle of 30°-60° to the untoothed inner face of said flange when the finger fits between adjacent teeth.

2. Cassette as defined in claim 1 wherein the roots of the teeth and the ramp are inclined at the same angle when the finger fits between adjacent teeth.

3. Cassette as defined in claim 2 wherein the sides of said teeth are substantially perpendicular to the inner face of said flange, as are the sides of the finger when it fits between adjacent teeth.

4. Cassette as defined in claim 3 and comprising a base and cover providing broad parallel bottom and top walls, respectively, and a post projecting from the bottom wall on which said brake lever is pivotally journalled, wherein the improvement further comprises:
   said reel is positioned with its toothed flange adjacent the top wall, and the maximum spacing between the top wall and the top of said finger is less than the thickness of said toothed flange.

5. Cassette as defined in claim 4 wherein a coil spring fits over the post and biases the finger of the brake lever toward said teeth.

6. Cassette having two tape reels, two posts, two springs, and two brake levers as defined in claim 5.

7. Cassette as defined in claim 6 wherein each of the cassette, reels and brake levers is plastic and each spring is metal.

8. Cassette as defined in claim 3 wherein each tooth is substantially triangular in the radial direction and a first edge of the tooth extends parallel to the inner face of said flange.

9. Cassette as defined in claim 8 wherein a second edge of the tooth extends perpendicular to the inner face of said flange.

* * * * *